(12) United States Patent
Wang

(10) Patent No.: US 6,267,340 B1
(45) Date of Patent: Jul. 31, 2001

(54) INSERTED SUPPORT

(76) Inventor: Chin-Yang Wang, No. 271, Zhen Chyan Street, Shul Lin, Taipei Hsien (TW)

(*) Notice: Subject to any disclaimer, the term of this patent is extended or adjusted under 35 U.S.C. 154(b) by 0 days.

(21) Appl. No.: 09/543,565

(22) Filed: Apr. 5, 2000

(51) Int. Cl.[7] ..................................................... B06R 11/02
(52) U.S. Cl. ............................... 248/231.21; 248/229.21; 248/309.1; 224/542
(58) Field of Search ............................. 248/176.1, 188.1, 248/188.8, 205.1, 213.2, 220.21, 224.8, 346.07, 229.12, 229.21, 231.9, 309.1, 500, 231.21; 224/542, 544

(56) References Cited

U.S. PATENT DOCUMENTS

| | | |
|---|---|---|
| D. 428,308 * | 7/2000 | Hartmann et al. ...................... D7/619 |
| 5,560,578 * | 10/1996 | Schenken et al. .................... 248/313 |
| 6,062,518 * | 5/2000 | Etue ................................. 248/231.21 |
| 6,113,049 * | 9/2000 | Miljanich .......................... 248/311.2 |

* cited by examiner

Primary Examiner—Ramon O. Ramirez
Assistant Examiner—Jon A Szumny
(74) Attorney, Agent, or Firm—Dougherty & Troxell

(57) ABSTRACT

An inserted support comprises a base plate, two supporting blocks, a volute disk, and a facial plate engaged with each other by fastening screws. The base plate has an upright edge surrounding the periphery thereof, and the upright edge has opposite recesses. A central elongated base groove is formed across the base plate. The supporting blocks are oppositely disposed at the base groove and each supporting block is a supporting post with a locating head to locate at the base groove. The volute disk has a volute groove at the bottom side thereof to receive the locating pins on the locating heads respectively while the volute disk is assembled to the base plate. The facial plate is provided corresponding to the base plate such that an extending downward edge thereof can be fitted with the upright edge on the base plate and a support part is provided thereon to associate with a mobile phone.

6 Claims, 3 Drawing Sheets

INSERTED SUPPORT

BACKGROUND OF THE INVENTION

1. Field of the Invention

The present invention relates to an inserted support, and particularly to an inserted support, which is capable of adapting with holes in a certain range of sizes.

2. Description of Related Art

A support is frequently applied to support articles and due to different ways of locating the support, there are kinds of supports available. For instance, if a support is made simply to place on a plane such as the floor, a base of the support usually is greater than the rest part thereof for acquiring a stable supporting function.

However, some other supports at the bases thereof are inserted into holes instead of placing on a plane. Thus, the connection and engagement between the base and the holes are subject worth us to investigate further.

Taking an example of the article carrier in a car, usually a supporting plate with holes is stored in front of the driver seat at a lateral side thereof for some car models such as Japanese cars. The holes are generally circular and used for placing beverage containers and the article carrier can be stored in the car body while not in use. In order to associate the hole with the connection of a support, a proper size of the hole has to be made to avoid a side effect influencing the supporting function of the support. For some other car models, the article carrier is placed between the driver seat and other front seats. But, the hole in the article carrier gets involved in the same problem as that in the Japanese car does.

The above example verifies a support by way of hole to perform an engaging effect is not limited in a car. But, an identical problem arose resides in that the size of the hole is differently arranged. Therefore, a design to adapt with a support with different size of hole is a core subject has to be overcome.

SUMMARY OF THE INVENTION

An object of the present invention is to provide an inserted support, which is possible to adapt with locating holes having sizes in a certain range.

BRIEF DESCRIPTION OF THE DRAWINGS

The present invention can be more fully understood by referring to the following description and accompanying drawing, in which.

DETAILED DESCRIPTION OF THE PREFERRED EMBODIMENTS

Figure 1:
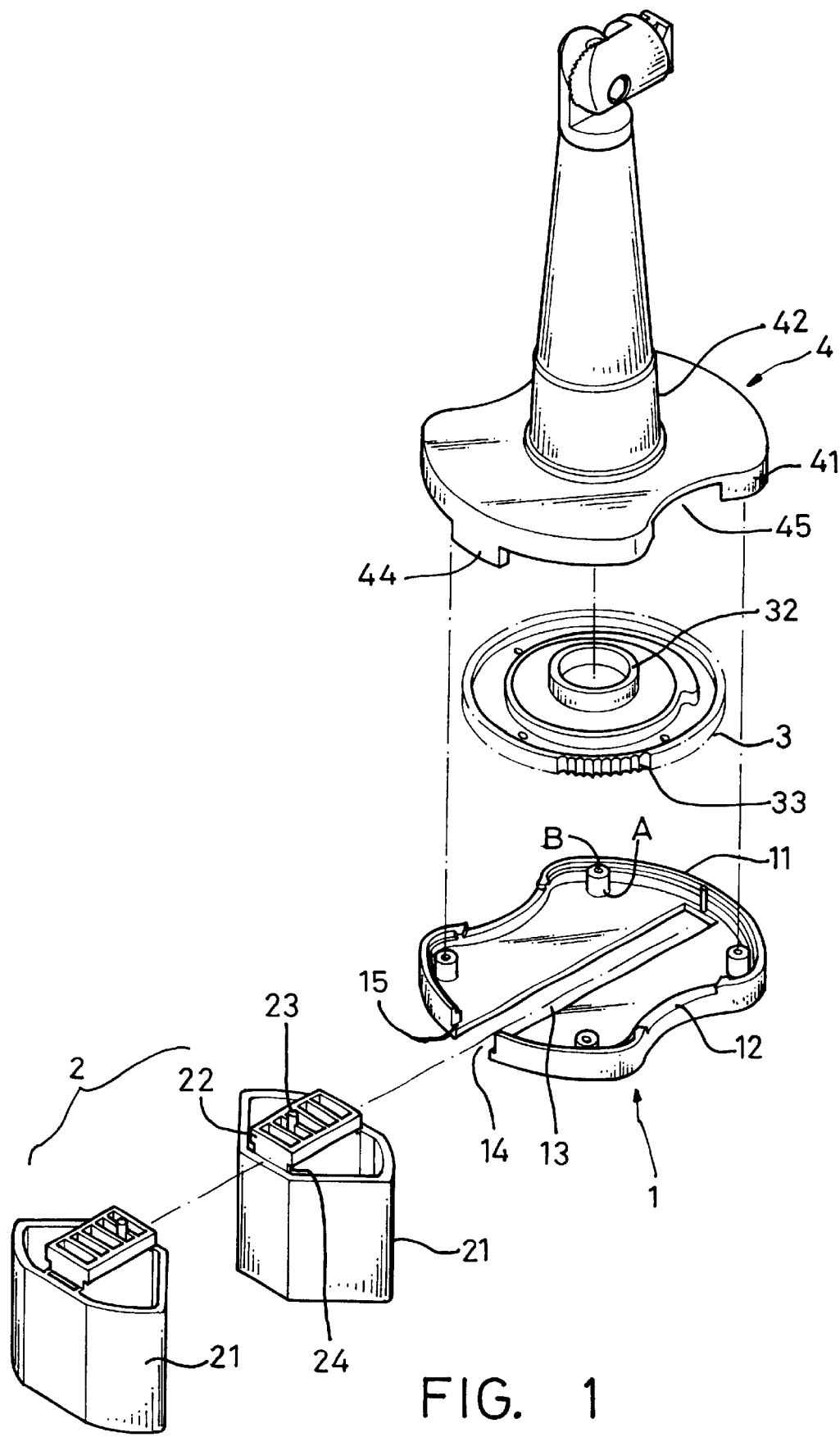
FIG. 1 is an exploded perspective view of an inserted support in accordance with the present invention.

Referring to FIG. 1, basically, an inserted support according to the present invention comprises a base plate 1, two supporting blocks 2, a volute disk 3, and a facial plate 4.

The base plate 1 is a plate with a thickness and has an integral upright edge 11 surrounding the plate for engaging with the facial plate 4. There are projecting spots "A" on the base plate 1 and each projecting spot "A" has a hole "B" therein to be fastened by screws. The projecting spot "A" and the hole "B" are prior art and no further detail will be described. Two opposite lateral sides of the base plate 1 each have a reduced inward part respectively. The upright edge 11 at the reduced inward parts is lower in height and forms two opposite recesses 12 to expose the volute disk 3. A central elongated base groove 13 is provided across the base plate 1 between the reduced inward parts such that an opening 14 is formed to intersect with the upright edge. Both ends of the upright edge at the opening 14 have a recess such that a projection 15 is formed respectively for being passed through by the supporting blocks.

The supporting blocks 2 are disposed oppositely and correspond to each other. Each supporting block 2 has a cross section of polygon as shown in FIG. 1, but it is not a restriction so that other shapes of cross section for the supporting block 2 can be applied either. The supporting block 2 basically is a supporting post 21, and a locating head 22 and a locating pin 23 both of which are extending outward from an end of the post 21. The supporting post 21 may be solid or hollow. The locating head 22 connects with the supporting post 21 and has a width slightly greater than that of the base groove 13. The locating head 22 at both lower lateral sides thereof is provided with a lower recess 24 respectively to connect with the supporting post 21 and the lower recesses 24 and have a height thereof not less than the thickness of the base plate 1 respectively. The locating pins 23 are extending outward from the locating heads respectively and it is preferable that the locating pins are oppositely disposed to each other as the opposite supporting blocks are. Hence, after assembly, the locating pins are near the central axis of the inserted support.

Figure 2:
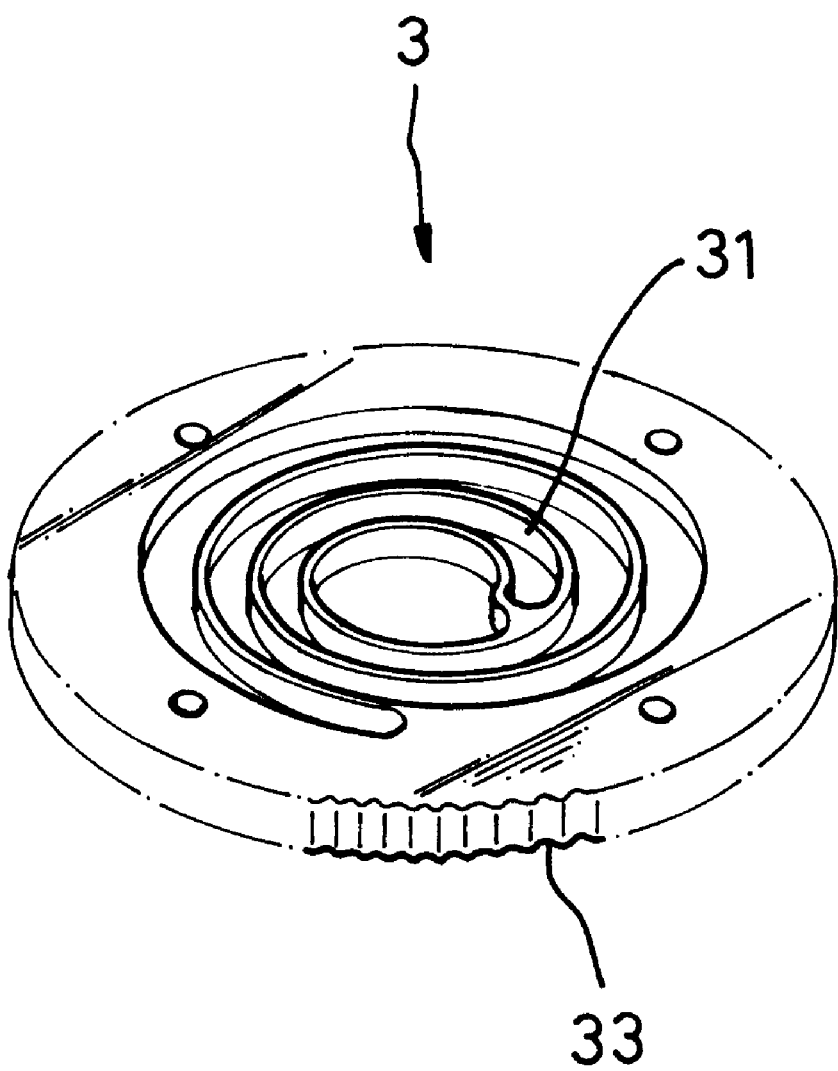
FIG. 2 is an another perspective view of a volute disk shown in FIG. 1 illustrating an inverse side thereof.

Referring to FIG. 2 accompanying with FIG. 1 again, the volute disk 3 is a circular plate and a volute groove 31 is provided at the bottom side thereof. The width of the volute groove 31 is greater than the outer diameter of each locating pin 23. An integral disk ring 32 is provided on the upper side of the volute disk 3 for engaging with the facial plate 4. In order to be moved easily, the volute disk 3 is provided with disk teeth 33 on the peripheral rim thereof. There are engaging holes on the volute disk 3 corresponding to the base plate 1 so as to fix the volute disk 3 to the base plate 1. The engaging holes are prior art and no further detail will be described.

Figure 3:
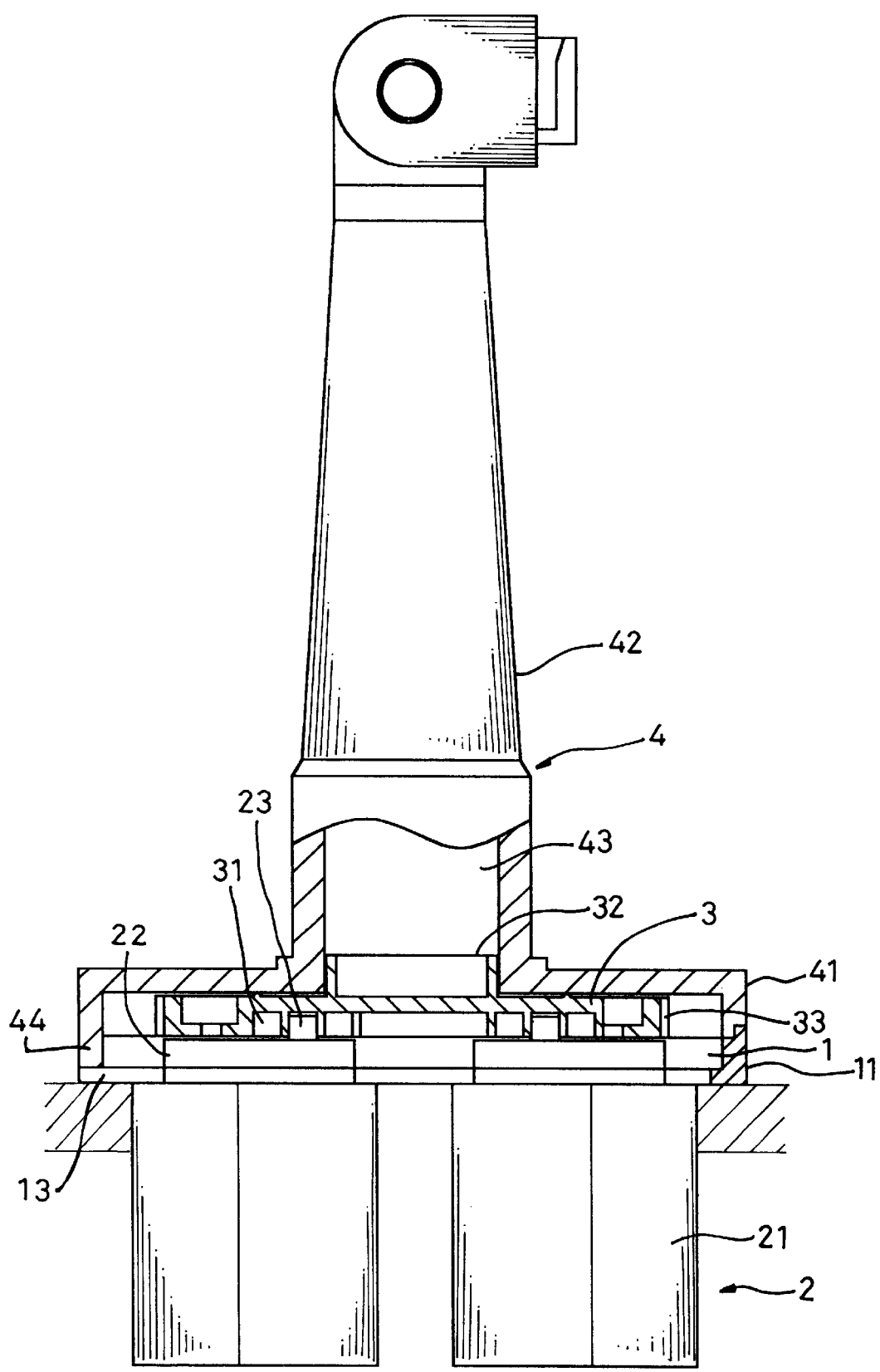
FIG. 3 is a partly sectional view of the inserted support shown in FIG. 1 after assembly.

Referring to FIG. 3 accompanying with FIG. 1 again, the facial plate 4 has a downward edge 41 surrounding the peripheral side thereof. The size of the facial plate 4 is corresponds to the base plate 1 to allow both the plates to be engaged with each other. The top of the facial plate 4 connects with a support part 42 and for instance, the support part 42 can be a stick with a connecting device for a mobile phone, as shown in the figures. A facial hole 43 may be provided corresponding to the disk ring 32 so as to be engaged with the volute disk 3. In order to prevent the supporting posts 2 from loosening, an integral extrusion 44 is provided corresponding to the opening 14 such that the extrusion 44 can block the opening 14. In order to expose the volute disk 3, the facial plate 4 provides two facial recesses corresponding to the base recesses 12.

Referring to FIGS. 1, 2, and 3 again, both the supporting blocks 2 are facing oppositely to clamp the base plate 1 with lower recesses 24 thereof first while assembling such that the locating heads 22 are above the base plate 1. Then, the supporting blocks 2 are moved inward oppositely such that the locating heads thereof can be placed at the central position of the entire base groove 13. The volute disk 3 then covers the locating heads 22 to allow the locating pins to be received in the volute groove 31. The facial plate 4 then fits with the base plate 1 such that the base plate 1, the volute disk 3, and the facial plate 4 can be engaged with the each other by way of screws as shown in FIG. 3. After assembling, part of the volute disk 3 exposes outside from the openings constituted by the base recesses 12 and the facial recesses 45.

The operation of the inserted support shown in FIGS. 1, 2, and 3 is explained hereinafter. When the supporting blocks 2 are inserted into hole the base plate 1 faces the plane around the holes. Then the volute disk 3 is turned manually by way of pushing the disk teeth 33 such that the locating pins 23 can move along the volute groove 31 to allow the supporting blocks 2 to stretch outward. At this time, the supporting posts 21 press against the wall surfaces of the holes in a state of locating. In the mean time, the support part 42 of the facial plate 4 can be used for supporting an article. Contrarily, the volute disk 3 can be turned inversely by way of pushing the disk teeth 33 in the opposite direction such that the supporting blocks 2 move inward to allow the supporting posts 21 moving away the inner wall of the holes. In this way, the entire support can be disengaged with the holes.

It is appreciated that the inserted support of the present invention is capable of adapting with holes of different sizes in a certain range. Furthermore, the locating pins 23 can be located respectively at right and at left by way of the outer wall of the volute groove 31 together with the base plate 1 being laid on the plane around the holes such that no loosening will occur.

While the invention has been described with reference to preferred embodiments thereof, it is to be understood that modifications or variations may be easily made without departing from the spirit of this invention, which is defined by the appended claims.

What is claimed is:

1. An inserted support, comprising:
   a base plate with two opposite lateral sides, having an upright edge surrounding a periphery thereof, having a reduced inward part on each respective opposite lateral sides, the upright edge at each of the reduced inward parts being formed with an opposite recess, and being crossed by a central elongated base groove between the reduced inward parts such that a base opening is formed to intersect with the upright edge, and both ends of the upright edge at the opening have a recess such that a projection is formed respectively;
   two supporting blocks, being opposite and corresponding to each other, each of the supporting blocks basically being a supporting post with an end, and the supporting post at the end thereof has a locating head extending with a width therefrom slightly greater than that of the base groove, the locating head at both lower lateral sides thereof provided with a lower recess respectively to connect with the supporting post and the lower recesses having a height thereof not less than the thickness of the base plate, and the locating heads have a locating pin extending outwardly with an outer diameter respectively;
   a volute disk with a facial side and a bottom side, being circular, the bottom side thereof being provided with a volute groove and the width of the volute groove being greater than the outer diameter of each locating pin, and having a diameter greater than the distance of the two lateral sides of the base plate;
   a facial plate, having a shape corresponding to the base plate, and having an extending downward edge surrounding a periphery thereof corresponding the upright edge on the base plate, having two facial recesses at the downward edge corresponding to the base recesses on the upright edge, and a support part being provided thereon;
   wherein, the opposite supporting blocks are engaged with the base groove from the base opening, the volute groove receives the locating pins while the volute disk is laid on the locating heads, the facial plate covers the base plate and both the plates are engaged with each other by way of fastening screws, two opposite outlets being formed by the corresponding base recesses and the facial recesses, and part of the volute disk exposes outside from the outlets for being capable of moving the volute disk to displace the supporting blocks and adjust the engagement of the supporting posts.

2. The inserted support as defined in claim 1, wherein the volute disk may be provided with disk teeth around a periphery rim thereof.

3. The inserted support as defined in claim 1, wherein a facial block may be provided on the facial plate to block the opening on the upright edge.

4. The inserted support as defined in claim 1, wherein a central hole is provided on the facial plate and a central ring is provided on the volute disk so as to fit with each other.

5. The inserted support as defined in claim 1, wherein the base plate, the volute disk, and the facial plate are fastened to each other by screws.

6. The inserted support as defined in claim 1, wherein the support part on the facial plate is a stick for associating with a mobile phone.

* * * * *